(12) United States Patent
Gross

(10) Patent No.: US 9,361,515 B2
(45) Date of Patent: Jun. 7, 2016

(54) DISTANCE BASED BINARY CLASSIFIER OF HANDWRITTEN WORDS

(71) Applicant: Xerox Corporation, Norwalk, CT (US)

(72) Inventor: Eric M. Gross, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 91 days.

(21) Appl. No.: 14/256,242

(22) Filed: Apr. 18, 2014

(65) Prior Publication Data

US 2015/0302243 A1 Oct. 22, 2015

(51) Int. Cl.
*G06K 9/00* (2006.01)
*G06K 9/72* (2006.01)
*G09B 7/02* (2006.01)

(52) U.S. Cl.
CPC ............ *G06K 9/00456* (2013.01); *G06K 9/723* (2013.01); *G09B 7/02* (2013.01)

(58) Field of Classification Search
None
See application file for complete search history.

(56) References Cited

U.S. PATENT DOCUMENTS

| | | | | |
|---|---|---|---|---|
| 5,422,961 A * | 6/1995 | Simard | ................ | G06K 9/6255 382/159 |
| 5,572,604 A * | 11/1996 | Simard | .................. | G06K 9/685 382/224 |
| 6,785,419 B1 * | 8/2004 | Jojic | .................... | G06K 9/6206 382/197 |
| 6,801,751 B1 * | 10/2004 | Wood | ....................... | G09B 7/02 434/322 |
| 7,058,567 B2 | 6/2006 | Ait-Mokhtar et al. | | |
| 7,167,849 B2 * | 1/2007 | Graepel | ............... | G06K 9/6255 706/20 |
| 7,343,041 B2 * | 3/2008 | Kwok | ................ | G06K 9/00852 382/187 |
| 7,624,277 B1 * | 11/2009 | Simard | .................... | G06F 21/31 704/270 |
| 8,027,540 B2 | 9/2011 | Serrano et al. | | |
| 8,224,092 B2 | 7/2012 | Bressan | | |
| 8,335,381 B2 | 12/2012 | Rodriguez Serrano et al. | | |
| 2002/0114523 A1 * | 8/2002 | Filatov | ................. | G06K 9/6292 382/229 |
| 2003/0174881 A1 * | 9/2003 | Simard | ............. | G06K 9/00422 382/159 |
| 2004/0017947 A1 * | 1/2004 | Yang | ..................... | G06K 9/6252 382/224 |
| 2005/0071300 A1 * | 3/2005 | Bartlett | ................ | G06K 9/6215 706/12 |
| 2005/0228591 A1 * | 10/2005 | Hur | ...................... | G06K 9/6215 702/19 |
| 2006/0160054 A1 * | 7/2006 | Onishi | ..................... | G09B 7/02 434/322 |
| 2006/0246410 A1 * | 11/2006 | Iwayama | ................. | G09B 7/00 434/323 |
| 2007/0048718 A1 * | 3/2007 | Gruenstein | ............. | G09B 7/06 434/322 |
| 2008/0123940 A1 * | 5/2008 | Kundu | ............... | G06K 9/00865 382/159 |

(Continued)

OTHER PUBLICATIONS

Simard et al., "Transformation Invariance in Pattern Recognition—Tangent Distance and Tangent Propagation", 1998.*

(Continued)

*Primary Examiner* — Aaron W Carter
(74) *Attorney, Agent, or Firm* — Fay Sharpe LLP

(57) ABSTRACT

This disclosure provides methods and systems to classify handwritten words associated with an answer to a question. According to an exemplary embodiment of this disclosure, a reference dictionary is constructed as a function of a known answer to the question, the reference dictionary including handwritten characters which are used for comparison purposes to determine if the handwritten answer if correct or not.

21 Claims, 4 Drawing Sheets

(56) References Cited

U.S. PATENT DOCUMENTS

| | | | |
|---|---|---|---|
| 2008/0254419 A1* | 10/2008 | Cohen | G09B 7/00 434/219 |
| 2008/0268956 A1* | 10/2008 | Suzuki | A63F 13/10 463/37 |
| 2009/0060335 A1* | 3/2009 | Rodriguez Serrano | G06K 9/00194 382/177 |
| 2010/0008581 A1* | 1/2010 | Bressan | G06K 9/00859 382/177 |
| 2010/0067793 A1* | 3/2010 | Serrano | G06K 9/6279 382/179 |
| 2010/0075290 A1 | 3/2010 | DeYoung et al. | |
| 2010/0080462 A1* | 4/2010 | Miljanic | G06K 9/00429 382/186 |
| 2010/0125451 A1* | 5/2010 | Napper | G06F 17/242 704/9 |
| 2010/0205124 A1* | 8/2010 | Ben-Hur | G06K 9/6215 706/12 |
| 2011/0078191 A1* | 3/2011 | Ragnet | G06F 17/30705 707/780 |
| 2013/0052630 A1* | 2/2013 | Mine | G09B 7/02 434/353 |
| 2014/0064622 A1* | 3/2014 | Newell | G06K 9/6292 382/195 |
| 2014/0093858 A1* | 4/2014 | Caruthers, Jr. | G09B 7/02 434/362 |
| 2014/0162238 A1* | 6/2014 | Carney | G09B 7/06 434/350 |
| 2015/0139547 A1* | 5/2015 | Yamaji | G06K 9/00416 382/186 |
| 2015/0187219 A1* | 7/2015 | Sheppard | G09B 3/06 434/354 |
| 2015/0302243 A1* | 10/2015 | Gross | G09K 9/00456 382/224 |

OTHER PUBLICATIONS

Gordo, Almazan et al., "Efficient Exemplar Word Spotting", pp. 1-24, BMVC 2012.

Simard, Patrice et al., "Efficient Pattern Recognition Using a New Transformation Distance", pp. 50-58, 1993.

* cited by examiner

DISTANCE BASED BINARY CLASSIFIER OF HANDWRITTEN WORDS

BACKGROUND

This disclosure and the exemplary embodiments described herein relate to recognizing whether or not a handwritten word corresponds to a correct answer to a question.

There is an increased effort to leverage student generated data to improve the education experience of students. Presently, schools rely extensively on hand written exams and manual grading and are expected to do so for a number of years. To assist in bringing handwritten information into digital form, robust handwriting recognition technology is required. However, handwriting recognition is a notoriously difficult problem if the characters comprising a word overlap or intercept in some way. Usually, some form of character segmentation is applied. However, there is a need for segmentation algorithms that perform well under conditions often encountered in practice.

INCORPORATION BY REFERENCE

U.S. Pat. No. 8,224,092, issued Jul. 17, 2012, by Marco J. Bressan, entitled "WORD DETECTION METHOD AND SYSTEM";

U.S. Pat. No. 8,335,381, issued Sep. 18, 2008, by Rodriguez Serrano et al., entitled "HANDWRITTEN WORD SPOTTER USING SYNTHESIZED TYPED QUERIES";

U.S. Pat. No. 8,027,540, Issued Sep. 27, 2011, by Rodriguez Serrano et al., entitled "ASYMMETRIC SCORE NORMALIZATION FOR HANDWRITTEN WORD SPOTTING SYSTEM";

U.S. Pat. No. 7,058,567, issued Jun. 6, 2006, by Ait-Mokhtar et al., entitled "NATURAL LANGUAGE PARSER";

U.S. Patent Publication No. 2010/0075290, published Mar. 25, 2010, by DeYoung et al., entitled "AUTOMATIC EDUCATIONAL ASSESSMENT SERVICE";

SIMARD, Patrice et al., "Efficient Pattern Recognition Using a New Transformation Distance", pages 50-58, 1993; and GORDO, Almazan et al., "Efficient Exemplar Word Spotting", pages 1-24, BMVC 2012, are incorporated herein by reference in their entirety.

BRIEF DESCRIPTION

In one embodiment of this disclosure, described is a computer implemented method of classifying handwritten words associated with an answer to a question using a distance based binary classifier, the method comprising: importing a known answer to a question; importing an image of a handwritten response to the question, the handwritten response to be classified as either a correct answer to the question or an incorrect answer to the question; constructing a reference dictionary set of words that is a function of the known answer, the referred dictionary set of words including handwritten characters associated with a source of the handwritten response to the question; comparing each word of the reference dictionary to the imported image of the handwritten response to be classified using a modified tangent distance (TD) process, wherein the modified TD process includes altering each individual character of a word that is a member of the reference dictionary independently, the alterations minimizing a distance between each word in the reference dictionary and the handwritten response, and the minimal distance being recorded for each word in the reference dictionary; and classifying the image of handwritten response as correct or incorrect based on the minimal distances recorded for each word in the dictionary.

In another embodiment of this disclosure, described is An image processing system comprising: a processor configured to receive a digital image of a handwritten word associated with an answer to a question, the processor configured to execute instructions to perform a method of classifying the digital image of the handwritten word using a distance based binary classifier, the method comprising: importing a known answer to a question; importing an image of a handwritten response to the question, the handwritten response to be classified as either a correct answer to the question or an incorrect answer to the question; constructing a reference dictionary set of words that is a function of the known answer, the referred dictionary set of words including handwritten characters associated with a source of the handwritten response to the question; comparing each word of the reference dictionary to the imported image of the handwritten response to be classified using a modified tangent distance (TD) process, wherein the modified TD process includes altering each individual character of a word that is a member of the reference dictionary independently, the alterations minimizing a distance between each word in the reference dictionary and the handwritten response, and the minimal distance being recorded for each word in the reference dictionary; and classifying the image of handwritten response as correct or incorrect based on the minimal distances recorded for each word in the dictionary.

In still another embodiment of this disclosure, described is a computer implemented method of classifying handwritten words provided in response to a question using a distance based binary classifier, the method comprising: importing a known answer to the question; importing a digital image of the handwritten word provided in response to the question; constructing a reference dictionary set of reference words including the known answer and one or more wrong answers, the reference words including one or more digital images of handwritten characters associated with a source of the handwritten response to the question; comparing each reference word associated with the reference dictionary to the imported digital image of the handwritten word provided in response to the question using a modified tangent distance (TD) process, wherein the modified TD process independently distorts each character in a reference word to provide a plurality of perturbations of the reference word for comparison with the imported digital image of the handwritten word, and the modified TD process determines and records a minimal distance for each reference word associated with the reference dictionary.

DETAILED DESCRIPTION

This disclosure provides exemplary embodiments of methods and systems for determining if a handwritten multi-character answer is a correct answer. The disclosed exemplary embodiments do not provide a handwriting recognition system, but primarily rather an image-based right/wrong detector. For situations in which there is a reasonably limited set of possible entities, for example a set of 20 names, the method and system can be applied to identifying what in fact was written. A set of reference answers is generated from either a student-specific predefined dictionary of words that includes the correct answer, and/or by constructing a set of words from the individual characters of the correct answer. A nearest neighbor classification method termed the "tangent distance" (TD) is used to generate a distance measurement from the student answer to each entry in the reference set. TD is a modified distance metric used in combination with a linear approximation to a set of specified transformations, e.g., affine, thinning, etc. The transformations enhance classification performance, i.e. robustness, since they achieve a degree of robustness against distortions between the test and reference images. If the "closest" reference entry corresponds to the actual answer, the answer is considered correct, otherwise the answer is considered incorrect. The tangent distance algorithm disclosed herein has been extended/enhanced to apply to multi-character words where small distortions to each letter is encoded into the algorithm. This approach has the effect of independently distorting each character in a reference word independently of any other character in the same word. In this way many more perturbations in the reference word can be considered. The method retains the same computational efficiency (quadratic programming) as the original nonenhanced TD method.

Figure 1:
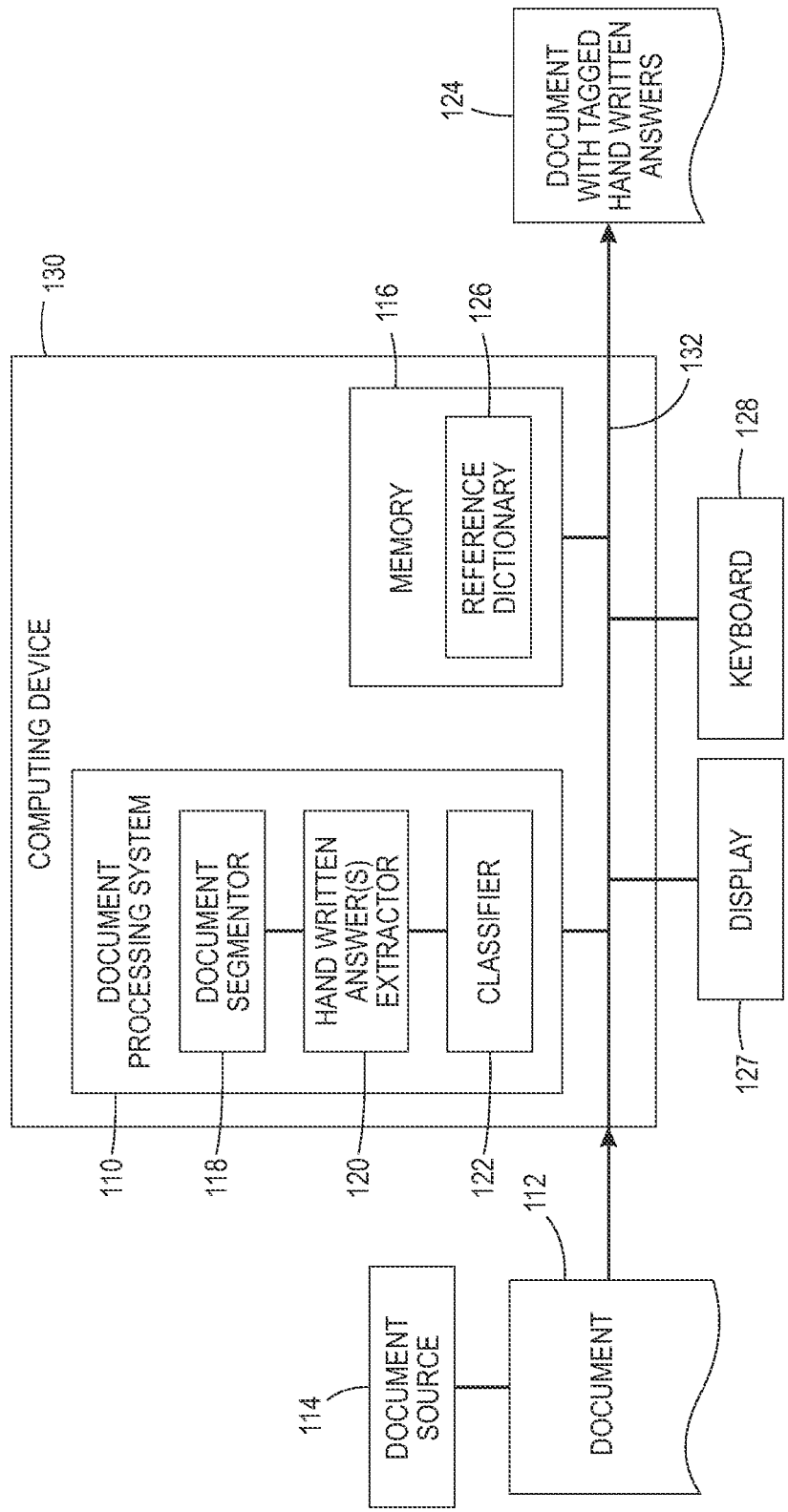
FIG. 1 is a block diagram of an exemplary embodiment of a system for classifying handwritten words using a distance based binary classifier according to this disclosure.

With reference to FIG. 1, an exemplary environment in which a system 110 for classification of handwritten word images in documents operates is shown. The processing components of the system 110 are best understood with reference to FIG. 2, which illustrates an exemplary method for classification of handwritten word images. Accordingly, the operation of these components will be described only briefly here.

Documents 112 to be processed by system 110 are received from a suitable source 114 of such documents, such as a scanner, camera, data storage device, or the like. Each document 112 may comprise one or more digital pages, each page comprising one or more images, such as binary images. In one aspect of the exemplary embodiment, the documents 112 to be processed comprise scanned images of physical documents which include handwritten text that provide a student's answer to questions, for example an exam. During processing, document images and handwritten word images may be stored in memory storage media 116, incorporated into or otherwise accessible to the system 110. The system 110 includes a document segmentor 118 which processes a document image to identify handwritten word images associated with one or more questions. For example, generally by identifying clusters of active pixels which are surrounded by inactive pixels. The segmentor 118 operates without consideration of the individual characters which form the handwritten word image. A handwritten word image can thus comprise any object within a document image, such as a word, numbers, a company logo, combination thereof, and the like, which is capable of being identified as a discrete entity by the particular segmentation techniques being used.

A handwritten answer(s) extractor identifies window images (patches) in a word image that has been identified by the segmentor 118. In particular, the handwritten answer extractor 120 performs a stepwise translation of the image with a window of fixed size, computes a center of gravity of the image data within the window, and re-centers the window to generate a window image comprising a subset of the image data in the word image. In other embodiments, the window images are generated uniformly, i.e., without the re-centering. In both embodiments, the window images (patches) are all of the same width.

A handwritten answer extractor 120 extracts handwritten words of an identified word image from the document. In particular, the handwritten answers are extracted from each of the pages of the document, each handwritten answer corresponding to an associated question. A classifier 122 is used to compute whether a match exists between a handwritten word image and a reference dictionary associated known answer to the question. The classifier is a distance based binary classifier of handwritten words, which is further described below.

The documents 112 processed by the system 110 may be tagged, e.g., with XML tags, which identify the handwritten answers present, optionally their locations in the document, and/or other information based on the handwritten answers and/or questions identified, such as a label associated with the overall document. The classification of the handwritten answers as correct or incorrect may be used to determine a score/grade associated with the document or whether it will undergo further processing, such as OCR. The tagged documents 124 may be then output by the system 110. In one embodiment, processing system 110 communicates with a display 127, for displaying an image of the document. The illustrated display 127 can be a liquid crystal display (LCD), a plasma display, a cathode ray tube (CRT) display, a projection display, or the like. The document image may be highlighted or otherwise modified to indicate any keywords identified by the processing system 110, e.g., for verification by a person using a suitable user input device 128, such as a keyboard, keypad, trackball, touch screen, voice recognition input device, or the like.

Processing system 110 may be hosted by any suitable computing device 130 that is capable of processing data, such as a general purpose computer, e.g., a desktop or laptop computer or a PDA or the like. Alternatively the host computer may be a dedicated computing device. The various components of the computer 130 may be all connected by a bus 132.

Each of the processing components 118, 120, 122, 124 may be in the form of software, hardware, or both. The processing components 118, 120, 122, 124 of processing system 110 may be in the form of software instructions, stored in memory 116 or elsewhere, for performing the exemplary method described with reference to FIG. 2. A processor, such as a central processing unit, or separate processors for each component in communication with the memory 116, executes the software instructions. While the system 110 is shown as having four processing components 118, 120, 122, 124, it is to be appreciated that two or more components may be combined or a component divided into two or more components. Components 118, 120, 122, 124 may all be resident in computing device 130 or may be otherwise accessible thereto.

Memory 116 can include random access memory (RAM), read-only memory (ROM), a hard disk, optical disk, or so forth and may be all physically located in the computing device or parts thereof may be accessible to the computing device, e.g., via a local area network or the Internet. The memory 116 may store data, including a document 112, a reference dictionary 126, and software for performing analysis and markup of the document. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The processor can be resident on one or more general purpose computers, special purpose computer(s), or the like and take the form of a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used as the processor.

Figure 2:
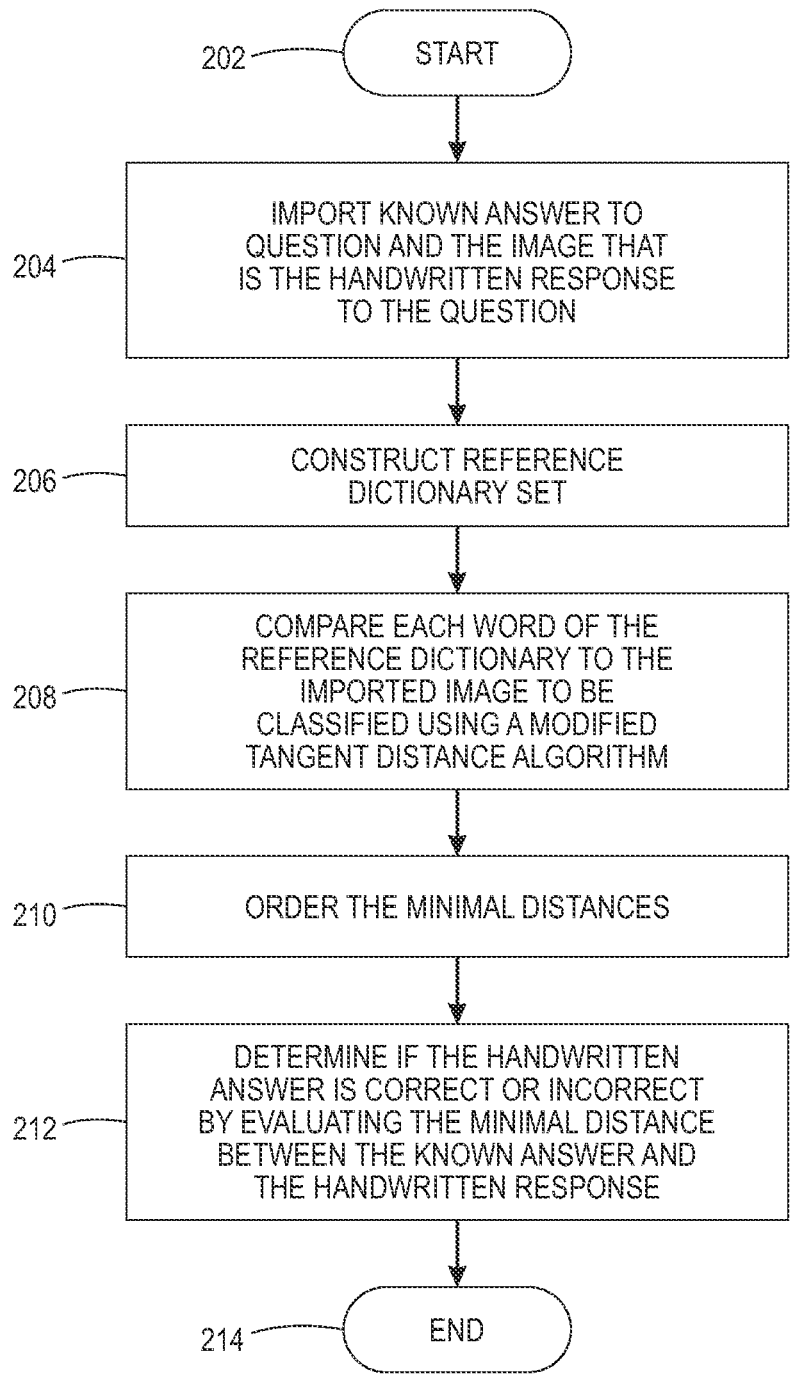
FIG. 2 is a flow chart of an exemplary method of classifying handwritten words using a distance based binary classifier according to this disclosure.

Having described an exemplary system for processing documents including a handwritten word answer, a method which may be performed with the exemplary system will now be described. FIG. 2 illustrates steps in an exemplary method for handwritten word, i.e. answer, classification as a correct/incorrect answer to a question, recognition in document images. It is to be appreciated that the method may include fewer, more or different steps from those illustrated and need to proceed in the order illustrated. Briefly, the method proceeds as follows.

The method begins at S200.

S204 includes importing known answer to question and the image that is the handwritten response to the question, i.e., the image that is to be classified.

S206 includes a constructing reference dictionary set. The reference dictionary set is a collection of words that is a function of the known answer to the question and is limited in the number of words it contains, for example on the order of S100. The reference dictionary is constructed from individual hand written characters, i.e., "a", "b", "m", etc., that are preferably, though not necessarily, generated by the same individual student who is the source of the imported image to be classified. Among the various words in the reference dictionary, one word must be the correct answer.

S208 compares each word of the reference dictionary to the imported image to be classified by using a modified tangent distance methodology. The modification is such that each individual character of a word that is a member of the reference dictionary is altered (translated, rotated, etc.) independently. The alterations are such that the distance between each word in the reference dictionary and the written response to be classified is minimized. This minimal distance is recorded for each word in the reference dictionary.

S210 orders the distances, for example from smallest to largest.

S212, if the distance between the reference dictionary word that is the known answer, and the handwritten response is in the top a %, or some percentage that can be specified, for example 5%, then declare the handwritten response to be the correct answer, otherwise declare it incorrect.

S214 ends the method.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Further details of the steps outlined are provided below.

Notably, for the purposes of further describing this disclosure, an educational system framework including the following capabilities is assumed:

1) The ability to customize the engine on a per student basis;

2) A-priori knowledge of the correct answer to a question; and

3) The ability to track the development of a student's hand writing over time.

The classification method and system provided herein is a nearest neighbor classification method and system termed a "tangent distance" approach, abbreviated "TD", see Simard, "Efficient Pattern Recognition Using a New Transformation Distance", pages 50-58, 1993. The disclosed TD method is a modified distance metric, such as a Euclidean distance, which is used by default, but other metrics are possible, used in combination with a linear approximation to a set of specified transformations, for example x translation, y translation, rotation, shear, size scaling, line thinning, etc. The transformations enhance classification performance since they achieve a degree of robustness against translation, rotation, etc. between the image in question, i.e., a handwritten word, and a set of reference images. Reference images will typically be the letters of the alphabet, upper and lower case, digits 0 through 9, and a collection of special characters such as $, %, etc. According to an exemplary embodiment, the process is implemented with some preprocessing steps to enable relatively fast real time implementation.

Step 1: For each reference image, Image_ref, Tangent vectors are pre-computed.

$$\text{Tangent\_Vector}_i = \text{Transformation}_i(\text{Image\_ref}, \alpha_i) - \text{Image\_ref}$$

Figure 3:
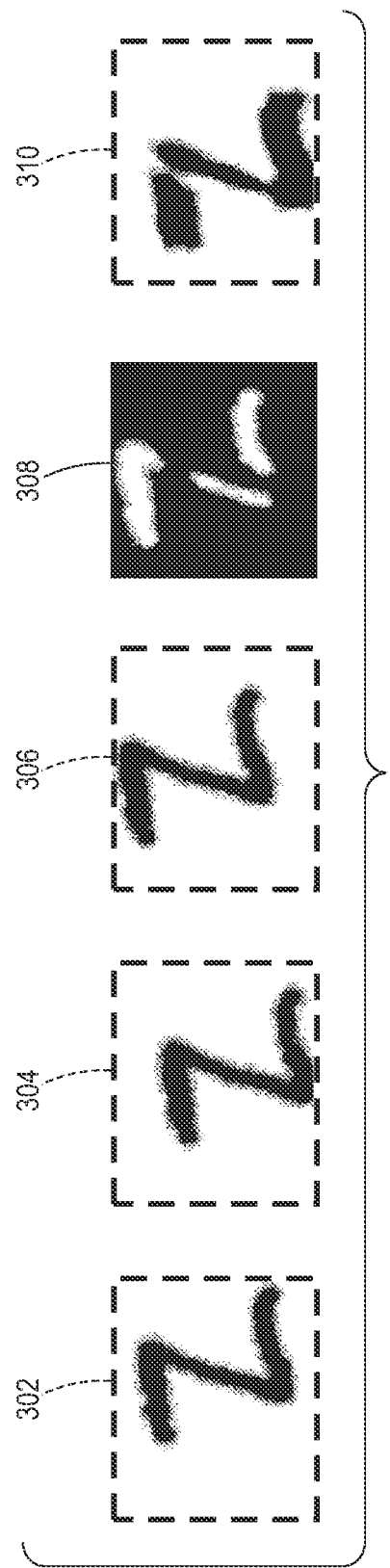
FIG. 3 illustrates an example original handwritten image and the associated $1^{st}$ Y-axis transformation, $2^{nd}$ Y-axis transformation, tangent vector and linear approximation to Y-axis transformation.

The example in FIG. 3 illustrates the preprocessing of the character "z", including an original image 302, a $1^{st}$ Y-axis transformation 304, a $2^{nd}$ Y-axis transformation 306, a tangent vector 308 and a linear approximation to Y-axis transformation 310.

The parameter "p", is adjustable, as will be further described below, to a value which results in a minimum distance between the image in question and the reference image.

Step 2: Compute "Distance" as the minimum metric between an image to be classified (Image_input) and the reference image modified with a liner approximation to the set of transformations. A quadratic programming methodology easily and quickly minimize the distance over p.

Step 3: Decide on a class belonging to Image_ref as that one with the minimum distance.

$$\text{Distance}(\text{Image\_ref}, \text{Image\_input}) = \text{MIN}_p[\|(\text{Image\_ref} + p * \text{Tangent\_Vector}) - \text{Image\_input}\|]$$

Figure 4:
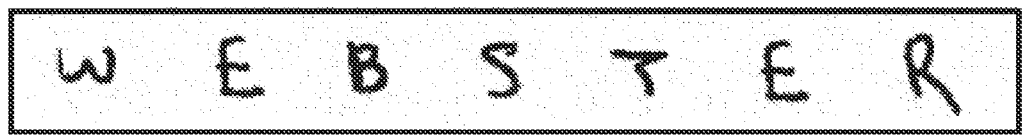
FIG. 4 illustrates an example handwritten answer to a question where the correct answer is "webster".
Figure 5:
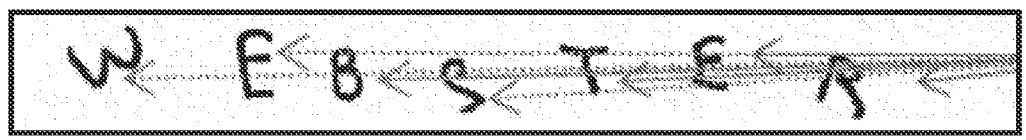
FIG. 5 illustrates a constructed correct answer of "webster" from handwritten primitives acquired from one or more handwriting samples obtained prior to capturing the image of FIG. 4.

Initial testing on handwriting samples indicated a 97% accuracy in classification of individual characters using the TD method with xy translation and rotation transformations only. Notably, the initial application was not optimized and included arbitrarily selecting characters for a reference set. According to this disclosure, the tangent vectors are suitably combined for the cases of multiple character words, where the tangent vectors are provided from the pre-computed tangent vectors associated with the individual characters. These vectors are arranged and padded with 0's accordingly such that there is now a unique parameter for each character and for each transformation type. Though the matrix is larger, it is still a relatively simple matter to solve quickly for the parameters that minimize the distance between the reference images and the image in question via quadratic programming. So, for example, suppose what is written is captured by the image of the word "Webster" in FIG. 4, and the correct answer is known to be "Webster". From student available primitives, the correct answer is constructed as shown in FIG. 5.

The image in question is compared to the correct answer and the comparison will translate, rotate, shear, etc., each of the individual letters w, e, b, s, t, e, and r independently. The distance is determined between what is written and a constructed answer with multiple transformations applied to characters independently so as to minimize the distance. In this way, the computation is insensitive to moderate changes in each characters xy location, shear, rotation, etc.

The distance is computed between the image in question and a reconstructed image of the known answer, and the distance is also computed between the image in question and a reference set of words. This reference set of words may include common misspellings of the known answer as well as words that may be considered close or likely wrong answers. If the distance between the correct answer and image in question is small relative to the distribution of distances across the reference set, then the image in question is determined to be equivalent to the answer. Using for example 100 words in the reference set, then the chance of a false positive would be on the order of 3% if the distance between the image in question and the correct answer was among the 3 smallest distances.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of classifying handwritten words associated with an answer to a question using a distance based binary classifier, the method comprising:
    importing a known answer to a question;
    importing an image of a handwritten response to the question, the handwritten response to be classified as either a correct answer to the question or an incorrect answer to the question;
    constructing a reference dictionary set of words that is a function of the known answer, the referred dictionary set of words including handwritten characters associated with a source of the handwritten response to the question;
    comparing each word of the reference dictionary to the imported image of the handwritten response to be classified using a modified tangent distance (TD) process, wherein the modified TD process includes altering each individual character of a word that is a member of the reference dictionary independently, the alterations minimizing a distance between each word in the reference dictionary and the handwritten response, and the minimal distance being recorded for each word in the reference dictionary; and
    classifying the image of handwritten response as correct or incorrect based on the minimal distances recorded for each word in the dictionary.

2. The computer implemented method of classifying handwritten words according to claim 1, wherein the known answer and handwritten response includes one or more of the letters of an alphabet and digits 0 through 9.

3. The computer implemented method of classifying handwritten words according to claim 1, wherein the modified TD process is a nearest neighbor classification process.

4. The computer implemented method of classifying handwritten words according to claim 1, wherein the modified TD process is a modified distance metric used in combination with a linear approximation to a set of specified transformations.

5. The computer implemented method of classifying handwritten words according to claim 4, wherein the modified distance metric is one of a Euclidean distance or any distance measures that satisfy the definition of a metric.

6. The computer implemented method of classifying handwritten words according to claim 4, wherein the set of specified transformations includes one or more of an X translation, Y translation, Rotation, Shear, Size Scaling, Line Thinning, or any morphological transformations common in digital image processing.

7. The computer implemented method of classifying handwritten words according to claim 1, wherein a Tangent Vector is computed for each individual character of a reference word, where $$\text{Tangent\_Vector}_i = \text{Transformation}_i(\text{Image\_ref}, \alpha_i) - \text{Image\_ref},$$

where i signifies that a computation or variable is specific to an individual character of the reference word, Image_ref is a reference image, and the function $\text{Transformation}_i(\ )$ is any transformation of the Image_ref by a parameter $\alpha_i$.

8. The computer implemented method of classifying handwritten words according to claim 7, wherein a linear approximation to a transformation is computed, the linear approximation being given by the equation:

$$\text{Image\_ref} + p * \text{Tangent\_Vector},$$

where p is a parameter adjustable from −1 to +1, and Tangent_Vector comprises one or more Tangent_Vector$_i$ tangent vectors.

9. The computer implemented method of classifying handwritten words according to claim 8, wherein the distance is computed as $$\text{Distance}(\text{Image\_ref}, \text{Image\_input}) = \\ \text{MIN}_p[\|\text{Image\_ref} + p * \text{Tangent\_Vector}) - \text{Image\_input}\|]$$

where Image_Input is an image to be classified, and $$\text{MIN}_p$$

is a function minimizing the distance between Image_ref and Image_input over p.

10. The computer implemented method of classifying handwritten words according to claim 1, wherein reference dictionary includes one or more of likely wrong answers, common misspellings of the known answer, common misspellings of the likely wrong answers.

11. An image processing system comprising:
    a processor configured to receive a digital image of a handwritten word associated with an answer to a question, the processor configured to execute instructions to perform a method of classifying the digital image of the handwritten word using a distance based binary classifier, the method comprising:
    importing a known answer to a question;
    importing an image of a handwritten response to the question, the handwritten response to be classified as either a correct answer to the question or an incorrect answer to the question;
    constructing a reference dictionary set of words that is a function of the known answer, the referred dictionary set of words including handwritten characters associated with a source of the handwritten response to the question;
    comparing each word of the reference dictionary to the imported image of the handwritten response to be classified using a modified tangent distance (TD) process, wherein the modified TD process includes altering each individual character of a word that is a member of the reference dictionary independently, the alterations minimizing a distance between each word in the reference dictionary and the handwritten response, and the minimal distance being recorded for each word in the reference dictionary; and classifying the image of handwritten response as correct or incorrect based on the minimal distances recorded for each word in the dictionary.

12. The image processing system according to claim 11, wherein the known answer and handwritten response includes one or more of the letters of an alphabet and digits 0 through 9.

13. The image processing system according to claim 11, wherein the modified TD process is a nearest neighbor classification process.

14. The image processing system according to claim 11, wherein the modified TD process is a modified distance metric used in combination with a linear approximation to a set of specified transformations.

15. The image processing system according to claim 14, wherein the modified distance metric is one of a Euclidean distance, or any distance measures that satisfy the definition of a metric.

16. The image processing system according to claim 14, wherein the set of specified transformations includes one or more of an X translation, Y translation, Rotation, Shear, Size Scaling, Line Thinning, or any morphological transformations common in digital image processing.

17. The image processing system according to claim 11, wherein a Tangent Vector is computed for each individual character of a reference word, where $$\text{Tangent\_Vector}_i = \text{Transformation}_i(\text{Image\_ref}, \alpha_i) - \text{Image\_ref}.$$

where i signifies that a computation or variable is specific to an individual character of the reference word, Image_ref is a reference image, and the function Transformation$_i$( ) is any transformation of the Image_ref by a parameter $\alpha_i$.

18. The image processing system according to claim 17, wherein a linear approximation to a transformation is computed, where the linear approximation being given by the equation:

$$\text{Image\_ref} + p * \text{Tangent\_Vector},$$

where p is a parameter adjustable from −1 to +1, and Tangent_Vector comprises one or more Tangent_Vector$_i$ tangent vectors.

19. The image processing system according to claim 18, wherein the distance is computer as $$\text{Distance}(\text{Image\_ref}, \text{Image\_input}) =$$
$$\text{MIN}_p[\|(\text{Image\_ref} + p * \text{Tangent\_Vector}) - \text{Image\_input}\|].$$

where Image_Input is an image to be classified, and $$\text{MIN}_p$$

is a function minimizing the distance between Image_ref and Image_input over p.

20. The image processing system according to claim 11, wherein reference dictionary includes one or more of likely wrong answers, common misspellings of the known answer, common misspellings of the likely wrong answers.

21. A computer implemented method of classifying handwritten words provided in response to a question using a distance based binary classifier, the method comprising:

importing a known answer to the question;

importing a digital image of the handwritten word provided in response to the question;

constructing a reference dictionary set of reference words including the known answer and one or more wrong answers, the reference words including one or more digital images of handwritten characters associated with a source of the handwritten response to the question;

comparing each reference word associated with the reference dictionary to the imported digital image of the handwritten word provided in response to the question using a modified tangent distance (TD) process, wherein the modified TD process independently distorts each character in a reference word to provide a plurality of perturbations of the reference word for comparison with the imported digital image of the handwritten word, and the modified TD process determines and records a minimal distance for each reference word associated with the reference dictionary.

* * * * *